April 15, 1930.                C. T. HATCH                1,754,947
                            POULTRY COOP OR CRATE
                             Filed Aug. 24, 1928

INVENTOR
Charles T. Hatch
BY Chappell & Earl
ATTORNEYS

Patented Apr. 15, 1930

1,754,947

UNITED STATES PATENT OFFICE

CHARLES T. HATCH, OF ALBION, MICHIGAN, ASSIGNOR TO UNION STEEL PRODUCTS COMPANY, OF ALBION, MICHIGAN

POULTRY COOP OR CRATE

Application filed August 24, 1928. Serial No. 301,714.

The main object of this invention is to provide in a poultry coop or crate an improved door which is lifted when swung to open position to clear a feed trough and is automatically engaged when closed with its retaining means.

A further object is to provide a structure having these advantages which is easily manipulated.

Objects pertaining to details and economies of my invention will definitely appear from the description to follow. The invention is defined in the claims.

A structure which embodies the features of my invention is clearly illustrated in the accompanying drawing, in which.

Figure 1:
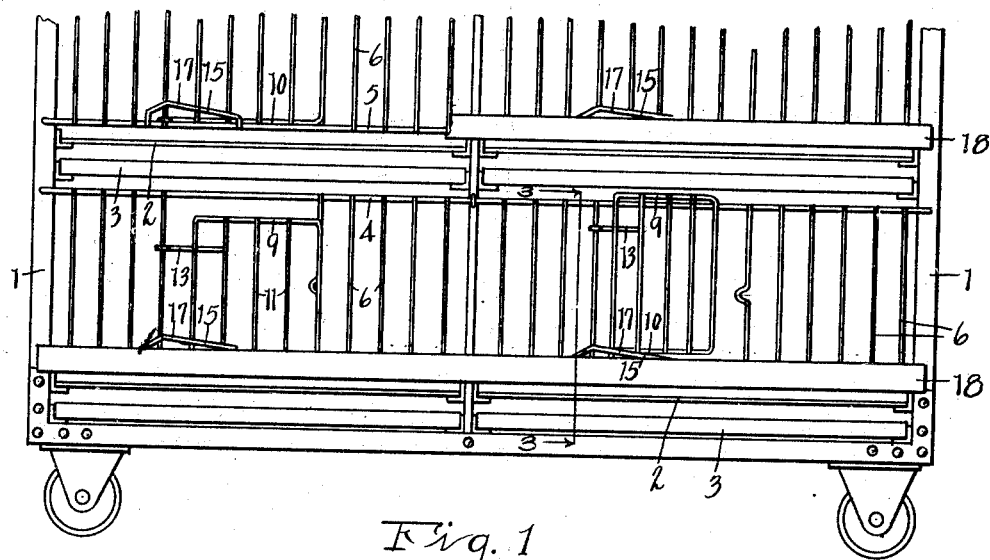
Fig. 1 is a fragmentary side elevation of a poultry coop of the feeding battery type embodying the features of my invention.
Figure 2:
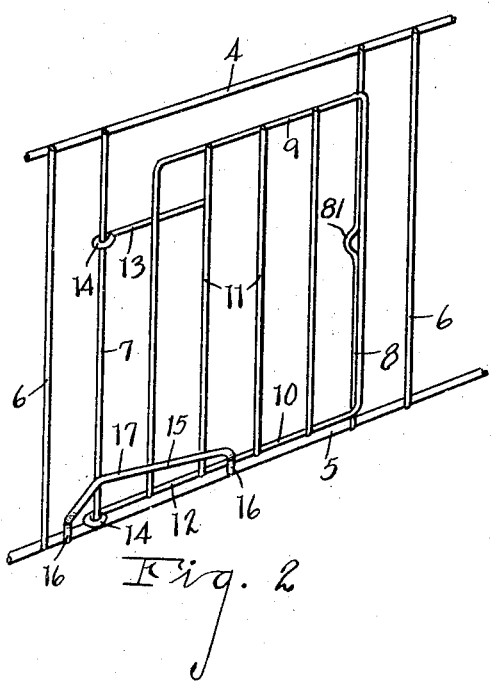
Fig. 2 is a fragmentary perspective view showing one of the doors and its relation to its wall panel.
Figure 3:
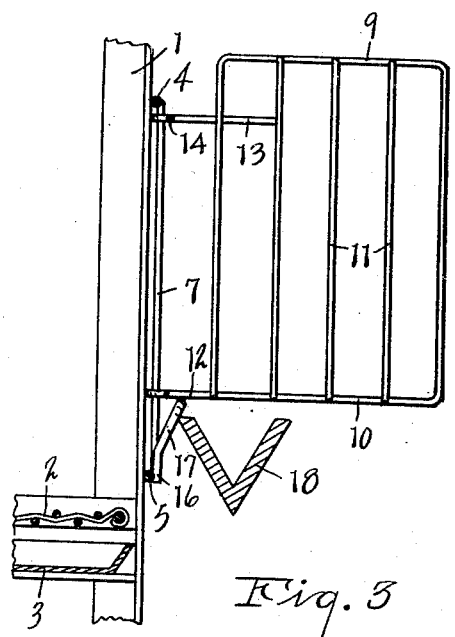
Fig. 3 is a detail vertical section on line 3—3 of Fig. 1.

Referring to the drawing, I provide a main frame designated generally by the numeral 1. In the structure illustrated there is a vertical series of decks or compartments, each compartment having a foraminated bottom 2 and tray 3. The wall panels of the compartments consist of top and bottom longitudinal wires 4 and 5, respectively, and vertical slats 6. These vertical slats are in practice formed of wire. The slats 7 and 8 are spaced to provide a door opening in the panels.

The door consists of top and bottom members 9 and 10 and vertical slats 11. The hinge members 12 and 13 are provided with eyes 14 engaging the slat 7 for pivotal and vertical sliding movement thereon. The slat 8 is offset at 81 which provides a stop for the door when in its closed position.

At the bottom of the door I mount the bail-shaped retaining and door lifting member designated generally by the numeral 15 and the arms 16 of this member are welded to the bottom longitudinal member 5 of the wall panel so that the bight portion 17 of this member is supported transversely across the lower end of the slat 7. When the door is closed it drops behind the member 15 which coacts with the bottom member 10 of the door to hold the door in closed position.

When the door is swung to open position it is lifted slightly until the bottom member 10 may ride upon the bight portion of the member 15 which is cammed or forwardly inclined so that, as the door is swung on its pivot, it is lifted, thereby clearing the feed trough 18 and preventing the operator from dislodging the feed trough by an outward pull of the door against the same.

This retaining member necessitates the lifting of the door in its initial opening movement and insures the elevating thereof as the door is swung to open position to clear the trough. To close the door it is only necessary to swing it shut and it automatically drops behind the retaining member.

Doors embodying the features of my invention are very easily manipulated to open and close the same.

Having thus described my invention what I claim as new and desire to secure by Letters Patent is:

1. In a structure of the class described, the combination of a panel comprising horizontal top and bottom bars and vertical slats secured thereto and disposed to provide a door opening, a door comprising top and bottom members and vertical slats, said door being provided with hinge members having pivotal and sliding engagement with the vertical slat at one side of said door opening, and a bail-shaped door retaining and lifting member, the arms of which are secured to the bottom longitudinal bar to project upwardly therefrom constituting a door retaining means, the bight portion of said member being forwardly inclined and disposed transversely of the panel slat on which the door is hinged so that the bottom member of the door rides thereon when the door is swung to open position thereby elevating the door.

2. In a structure of the class described, the combination of a panel comprising horizontal top and bottom bars and vertical slats secured thereto and disposed to provide a door opening, a door comprising top and bottom members and vertical slats, said door being provided with hinge members having pivotal and sliding engagement with the vertical slat at one side of said door opening, and a door retaining and lifting member secured to the bottom longitudinal bar to project upwardly therefrom constituting a door retaining means, said member being forwardly inclined so that the bottom member of the door rides thereon when the door is swung to open position thereby elevating the door.

3. In a structure of the class described, the combination of a panel comprising horizontal top and bottom bars and vertical slats secured thereto and disposed to provide a door opening, a door comprising top and bottom members and vertical slats, said door being provided with hinge members having pivotal and sliding engagement with the vertical slat at one side of said door opening, the vertical slat at the opposite side of said door opening having an offset therein providing a door stop, and a door retaining and lifting member secured to the bottom longitudinal bar to project upwardly therefrom constituting a door retaining means, said member being forwardly inclined so that the bottom member of the door rides thereon when the door is swung to open position thereby elevating the door.

4. In a structure of the class described, the combination with a wall panel comprising vertical slats disposed to provide a door opening, a door mounted on one of said slats for vertical and pivotal movement, and a member disposed at the bottom of the door and projecting upwardly at the side thereof to constitute means for retaining it in closed position and for elevating the door when it is opened.

5. In a structure of the class described, the combination of a panel comprising horizontal top and bottom bars and vertical slats secured thereto and disposed to provide a door opening, a door provided with hinge members having pivotal and sliding engagement with the vertical slat at one side of the door, and a door retaining and lifting member secured to the bottom longitudinal bar of said panel to project upwardly therefrom constituting a door retaining means, said member being forwardly inclined so that the bottom of the door rides thereon when the door is swung to open position thereby elevating the door.

In witness whereof I have hereunto set my hand.

CHARLES T. HATCH.